Figure 1:
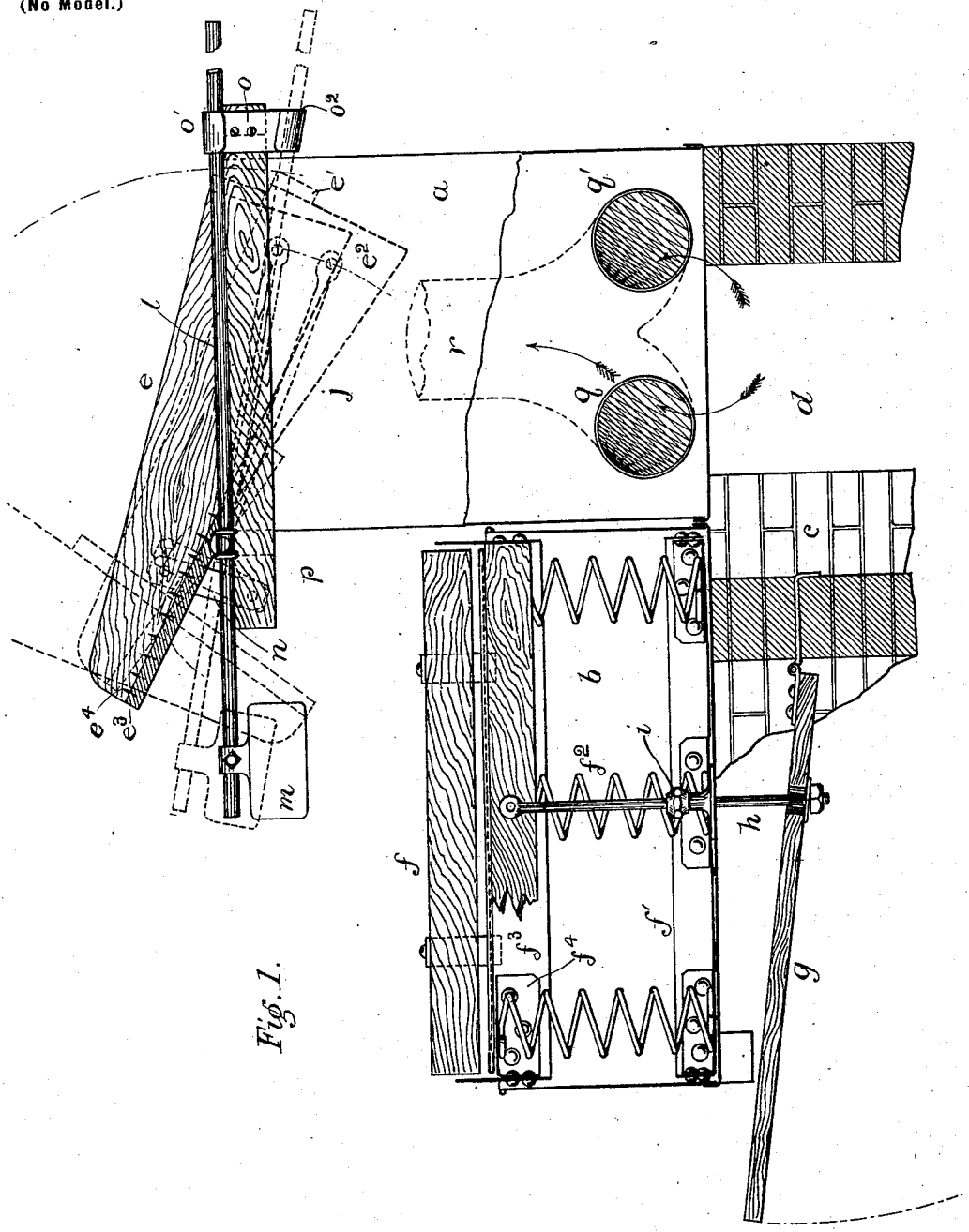

No. 711,612. Patented Oct. 21, 1902.
W. K. ALLEN.
FRUIT DIPPING MACHINE.
(Application filed Feb. 25, 1901.)
(No Model.) 3 Sheets—Sheet 1.

Witnesses:
E. M. Howatson
Mark O'Neill

Inventor,
William K. Allen
By J. Geisler
Attorney.

No. 711,612. Patented Oct. 21, 1902.
W. K. ALLEN.
FRUIT DIPPING MACHINE.
(Application filed Feb. 25, 1901.)
(No Model.) 3 Sheets—Sheet 2.
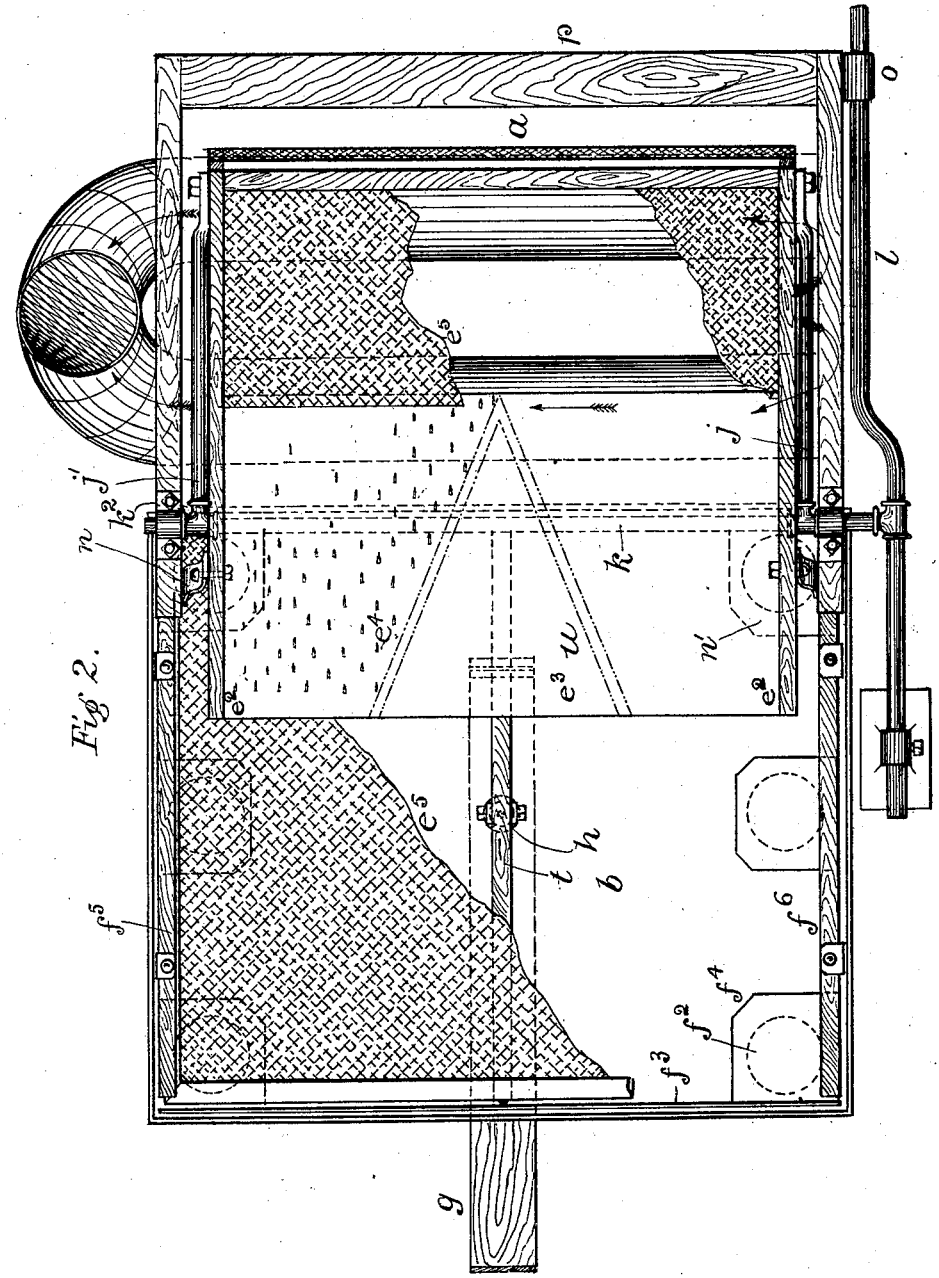
Witnesses:
E. M. Howatson
Mark O'Neill
Inventor,
William K. Allen
By, H. Geisler
Attorney.

No. 711,612. Patented Oct. 21, 1902.
W. K. ALLEN.
FRUIT DIPPING MACHINE.
(Application filed Feb. 25, 1901.)
(No Model.) 3 Sheets—Sheet 3.
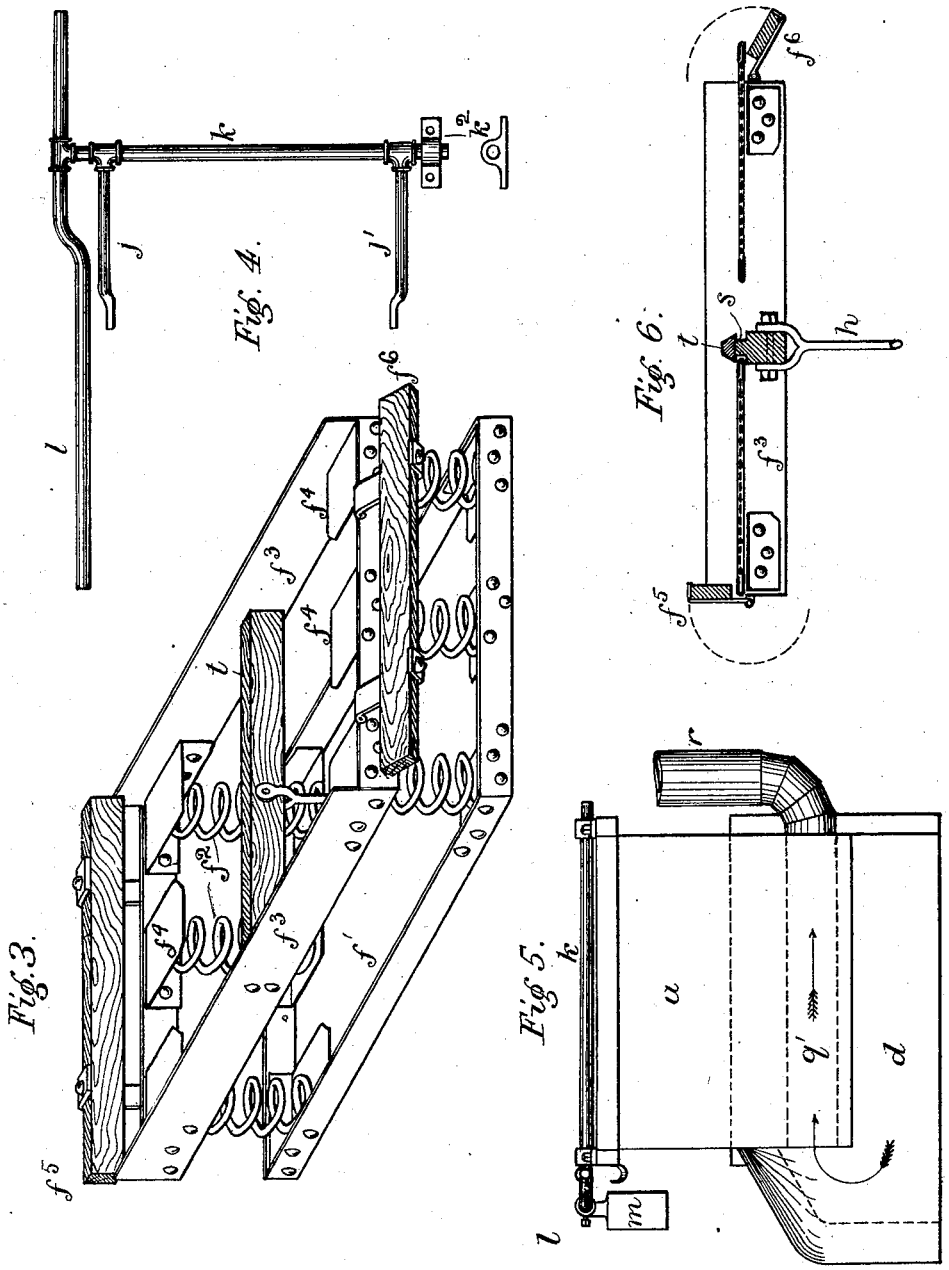
Witnesses:
E. M. Howatson
Mark O'Neill
Inventor,
William K. Allen
By T. J. Geisler
Attorney.

UNITED STATES PATENT OFFICE.

WILLIAM K. ALLEN, OF NEWBERG, OREGON.

FRUIT-DIPPING MACHINE.

SPECIFICATION forming part of Letters Patent No. 711,612, dated October 21, 1902.

Application filed February 25, 1901. Serial No. 48,848. (No model.)

*To all whom it may concern:*

Be it known that I, WILLIAM K. ALLEN, a citizen of the United States of America, and a resident of Newberg, Yamhill county, Oregon, have invented a new and useful Fruit-Dipping Machine, of which the following is a specification.

My invention relates to devices for giving fruit which is to be dried, particularly prunes and plums, the preliminary treatment to put it in condition so as to be successfully dried, the treatment referred to being the breaking, pricking, or puncturing, also called "checking," of their skins to allow a ready escape of the fruit-juices evaporated in the drier, which otherwise would have to exude through the stem end of the fruit, with the effect of retarding the drying process and interfering with the successful completion of the same. Such treatment of the fruit-skins is generally accomplished by two operations, the one being a chemical operation and consisting of immersing the fruit in a strong solution of lye for removing the oily outer coating of the fruit-skin, called "bloom," provided by nature to prevent the evaporation of the fruit-juices, and the removing of which leaves the skin of the prune or plum in a porous state ready for the drying operation; but as this lye treatment of fruit must be applied to suit the average condition of the mass of fruit, and as the thickness of fruit-skins varies and some fruit will always be found in any lot the skins of which have not been rendered sufficiently porous in the chemical or dipping treatment thereof, mechanical treatment of such fruit-skins must be resorted to to produce punctures or breaks therein affording an escape for the fruit-juice while evaporating. If it were not for such contingent failure of attaining the desired result from the dip of the fruit in the lye solution, the mechanical pricking of the prune would afford no additional benefit, for other than an insufficient action on the fruit-skin there is no fault to be found with the dipping operation and nothing would remain to be done in the preliminary treatment of the fruit to put it in just the required condition for efficient drying and for producing an article acceptable in the market. This, however, cannot be said of the mechanical treatment of the fruit-skins—the mere puncturing of the same—for it is necessary besides that the bloom of the prune and plum be removed to counteract excessive acidity and impart to the fruit when dried the preferable dark color. I therefore conceived the idea that by combining the two described treatments the fruit could be put in its best state. Such double treatment of the fruit would, however, impose additional labor and loss of time and incidental increase of cost of production unless the two treatments can be effected by a single manipulation of the fruit requiring no more time or attention than either of the treatments singly.

Should the described mechanical treatment of the fruit not be desired, my invention may also be efficiently used as a device for the lye-solution dip alone.

To facilitate the rapid handling of a lot of fruit in the course of its stated preliminary treatment, it is also desirable that the fruit be lifted from the rinsing tank or trough on its tray ready for placing in the drier without further handling. To be in this condition, the fruit on the tray before being placed in the drier must be spread out in a single layer. To do this by hand is not only awkward and time-consuming, but besides it is injurious to the fruit to be handled too much, because of its rather soft condition after having been dipped in the lye solution. For this reason I have availed myself of the buoyant agency of the rinsing-water to spread the fruit evenly in a single layer over the tray and have contrived to be able to regulate the quantity of fruit in each dip in the lye solution to be approximately proportioned to so cover the tray. The machine and devices whereby I attain the objects referred to and whereby I am able to handle a large quantity of fruit conveniently and successfully are illustrated in the accompanying drawings, referred to as a part of this specification, and in which—

Figure 1 is a vertical section longitudinally taken from end to end through my machine as shown in the plan thereof in Fig. 2, the upper portion of the lye-tank *a* being shown in elevation. Fig. 2 is a plan of machine. Fig. 3 is a perspective elevation of the reciprocating tray-carrier of the rinsing-tank *b*. Fig. 4 is a plan detail of the shaft, carrying-arms, and operating-lever of the dipper $e$. Fig. 5 is an end elevation, on a reduced scale, of the lye-tank and the furnace thereunder, the shaft $k$ of the dipper being also shown, and the course of the heating-flues $q\ q'$ from furnace through lye-tank being shown in dotted lines; and Fig. 6 is a vertical cross-section, on a reduced scale, of the upper portion of the reciprocating tray-carrier so modified as to be adapted to hold two trays instead of one. The letters designate the parts referred to in the description hereinafter given.

My invention comprises a lye-tank $a$ and a rinsing-tank $b$, arranged side by side on an elevated foundation $c$. A furnace or fire-chamber $d$ is built under the lye-tank for heating the latter and keeping the lye solution therein at a sufficiently hot temperature. The fruit is thrown on the dipper $e$. The dipper comprises a rectangular frame made of a head-rail $e'$ and two sides $e^2$. The bottom of this frame from its open or discharge end to about the middle thereof is covered by a flat table or board $e^3$, in the upper surface of which are driven a number of sharp pricking-points or needles $e^4$. The bottom and head of the dipping end of the dipper are covered with an open woven-wire fabric $e^5$ of suitable mesh. The dipper is operatively suspended from the arms $j\ j'$, rigidly attached to a shaft $k$, journaled in boxes $k^2$, affixed on a wooden frame $p$, secured to the upper part of the lye-tank, and from the pivoted arms $n\ n'$. To one end of the shaft $k$ is attached an operating and balancing lever $l$, from the short end of which is hung an adjustable measuring-weight $m$. The shaft $k$, arms $j\ j'$, and lever $l$ may be made of pipe and T-couplings, as shown in Fig. 4. The suspending devices for the dipper are so operatively arranged that the head end of the dipper may be conveniently immersed in the lye solution and then lifted therefrom and the dipper stood on an end in such position as to discharge the dipped fruit over the center of the rinsing-tank, the dipper being operated by means of the lever $l$. When the lever is not operated, the handle thereof is held in a holder $o$, having two projecting rests $o'\ o^2$, the upper of which restrains the lever against the measuring-weight $m$ and the lower serving as a support for the dipper when filled with fruit to a quantity outweighing the measuring-weight. The function of such measuring-weight is to indicate when there has been put into the dipper a quantity of fruit proportioned to the capacity of the tray therefor provided in the rinsing-tank. As the relative weight and size of each lot of fruit are variable, the weight in the first instance can only be approximately adjusted and must thereafter be readjusted to weigh more or less fruit, if required, and thereafter the fruit-dipping may be expeditiously done. The dipped fruit on being discharged from the dipper rolls over the needle-board, and thus each piece of fruit is subjected to two treatments for the purpose of checking or puncturing its skin, the first treatment being the chemical action of the lye and the second the mechanical action of the pricking-points, and a sufficient puncturing of the fruit-skin would be fairly assured to facilitate the successful drying thereof.

The furnace or fire-chamber $d$ extends under a portion of the rinsing-tank $b$ in order that the rinsing-water may be sufficiently heated to readily wash off the lye solution coating the fruit. If the rinsing-water were of much lower temperature than the lye solution, it might have the effect of precipitating some of the lye on the fruit-skin if the lye solution were strong, and, besides heating the rinsing-water, would remove the unpleasantness of having to dip one's hands in cold water while handling and lifting out a tray full of rinsed fruit.

To thoroughly rinse the fruit after its immersion in the lye solution, the same should be well agitated in the rinsing-tank. To accomplish this, I have provided a carrier $f$, having an up-and-down reciprocating motion and operated by a treadle $g$ by the foot. This reciprocating tray-carrier is so constructed as to be easily removable from the rinsing-tank for cleaning or repair and consists of a base-frame $f'$, to which are attached a series of vertically-arranged spiral springs $f^2$, supporting an upper frame $f^3$. The upper frame is provided with a number of brackets $f^4$, a part of which help to brace the frame, and all of them provide a bearing-surface for the heads of the spiral springs to act against and also provide the supports for the fruit-trays. The ends of the upper frame are left open in part, and in such open spaces are hinged rails $f^5\ f^6$. When desiring to place a fruit-tray on the reciprocating carrier, the said hinged rails $f^5\ f^6$ are thrown back and the fruit-tray placed between the front and back rails. The hinged rails are then lifted up and lapped over the ends of the fruit-tray, securely holding the same, and at the same time such rails, together with the front and back rails of the frame, provide a rail extending all around the fruit-tray, holding the fruit on the tray and preventing the same from becoming jammed between the reciprocating carrier and the walls of the rinsing-tank. The rail $t$ of the upper frame of the reciprocating carrier is connected by means of a rod $h$ with the treadle $g$, such rod extending through a stuffing-box $i$ in the bottom of the rinsing-tank. The reciprocating carrier when at rest is adapted to hold the fruit-tray just above the level of the rinsing-water. By operating the treadle, and therewith the reciprocating carrier, the fruit on the tray carried by the latter is thoroughly agitated in the rinsing-water, and at the same time the tendency of such agitation is to spread the fruit in an even layer on the tray, which even spreading of the fruit may be facilitated by a careful manipulation of the treadle toward the end of each rinsing operation—that is, gradually shortening the strokes of the foot and of the treadle. The vibrating support by which the fruit-tray is removably supported in the rinsing-tank facilitates the performance of the three steps which are required in the treatment of the fruit discharged on the tray from the dipper—namely, the thorough washing of the fruit, the spreading of the fruit evenly over the tray, and draining the fruit again after the washing and spreading thereof have been accomplished. For the purpose of such draining I deem it preferable that the vibrating support be adapted to normally hold the tray above the surface of the water in the tank. By measuring the fruit thrown into the dipper, as described, I can regulate the quantity discharged on the tray to be just sufficient to spread in an even layer thereon. When sufficient fruit has been thrown into the dipper to overbalance the weight $m$, the lever $l$ drops to the position $o^2$. (Indicated in dotted outlines.) By now springing the handle of the lever $l$ outward a trifle, so as to clear the holder $o$, the dipper may be raised or tilted to an upright position and the fruit emptied out of the same on the tray in the rinsing-tank.

In building my above-described machine the tanks may be made of sheet-iron. The reciprocating carrier of the rinsing-tank may also be made of sheet-iron, and other portions of the machine may be made of any convenient material.

To quickly and sufficiently heat the lye solution, the flame and heated products of combustion are led through flues $q$ $q'$, entering the lower portion of the lye-tank and connecting with a common stack $r$.

The reciprocating tray-carrier may be readily modified and enlarged, as illustrated in Fig. 6, so as to be adapted to carry two trays instead of one, the rinsing-tank being correspondingly enlarged. All that is required to be done is to provide laterally-extending grooves $s$ in the center rail $t'$, in which to insert one of the sides of a tray. The grooves $s$ may be easily made by rabbeting the two sides of the rail $t'$ and securing a slat on the top thereof. The two trays are arranged side by side lengthwise between the sides $f^3$ of the reciprocating carrier instead of crosswise, as in case the rinsing-tank is intended for a single tray only, and when the machine is to be modified to carry two trays the discharge end of the dipper should be provided with guide-rails $u$, (indicated in broken outline in Fig. 2,) so as to divide the fruit being discharged into two portions and drop each portion about over the center of the respective trays.

What I claim, and desire to secure by Letters Patent of the United States, is—

1. In a fruit-dipping machine, the combination of a rinsing-tank, a fruit-tray, and a vibrating support for supporting said tray within the tank, said support comprising a frame and a series of springs; the latter removably supporting the tray by its frame, and adapting the same to be vertically reciprocated in the tank for the purpose specified, substantially as described.

2. In a fruit-dipping machine, the combination of a rinsing-tank, a removable tray, and a vibrating support therefor, comprising a frame and a series of springs; said vibrating support removably holding the tray in the tank above the surface of the water therein contained, and being adapted to allow said tray to be vertically reciprocated in the tank for the purpose specified; means for securing the said removable tray on its said vibrating support; and means for vibrating the said support, substantially as described.

3. A fruit-dipping machine, comprising in combination, a lye-tank and a rinsing-tank arranged side by side; means for heating the said tanks; a suitable fruit-dipper operatively suspended in arms journaled in the mouth of the lye-tank and adapted to discharge the fruit from the dipper over the rinsing-tank, the bottom of the discharge end of the dipper being provided with numerous pricking-points; means for operating the dipper to dip the fruit therein deposited and discharge the same again; a vertically-reciprocating tray-carrier in the rinsing-tank adapted to hold a fruit-tray, and means for operating such tray-carrier, substantially as described.

4. In a fruit-dipping machine, the combination with the lye-tank and the dipper operatively suspended in the mouth of the same, of a rinsing-tank, a removable vibrating tray-carrier therein, comprising a base-frame, springs supported thereon; a tray-holding frame seated on said spring; and a treadle connected with the said tray-holding frame, and adapted to operate the same, substantially as described.

5. In a fruit-dipping machine, the combination with the lye-tank, and the dipper operatively suspended in the mouth of the same; of a rinsing-tank, a removable tray-carrier therein comprising a lower supporting-frame, an upper tray-holding frame having dropping ends adapted when raised to clamp the fruit-tray and secure the same; springs for reciprocally supporting the latter, and means for operating the tray-carrier, substantially as described.

6. In a fruit-dipping machine, the combination with the lye-tank and the dipper operatively suspended in the mouth of the same, of a rinsing-tank; a removable, vibrating tray-carrier therein, comprising a lower frame, $f'$, and upper frame, $f^3$, having dropping ends, adapted, when raised, to clamp the fruit-tray, and secure the same in place; springs supporting the upper frame over the lower frame; a treadle, and a connection therefrom to said upper frame to operate the same, substantially as described.

7. In a fruit-dipping machine, the combination with the lye-tank, and the dipper operatively suspended in the mouth of the same; of a rinsing-tank; a removable vibrating tray-carrier therein comprising a lower frame, $f'$, upper frame, $f^3$, having dropping ends adapted when raised to clamp the fruit-tray and secure the same; springs, supporting the upper frame over the lower frame; a treadle, and a rod, $h$, extending through a stuffing-box in the bottom of the tank, and operatively connecting said vibrating tray-carrier with said treadle, substantially as described.

8. A fruit-dipping machine combining a lye-tank and a rinsing-tank arranged side by side; a furnace for heating the former, extending also under and heating the latter; a dipper, the dipping end of which is covered with a net-like material, and the end thereof having numerous pricking-points, said dipper being suspended by arms $j, j'$, rigidly attached to a shaft, $k$, rotatably attached to the mouth of the lye-tank, and arms, $n, n'$; an operating-lever $l$; a holder as, $o$; a measuring-weight adjustable on an extension of the lever, $l$; a removable tray-carrier in the rinsing-tank, comprising a lower frame, $f'$, upper frame, $f^3$, having dropping ends adapted when raised to clamp the fruit-tray and secure the same; springs supporting the upper frame over the lower frame; a treadle, and a rod, $h$, extending through a stuffing-box in the bottom of the tank, and operatively connecting said vibrating tray-carrier with said treadle, substantially as described.

In testimony whereof I have hereunto affixed my signature, in the presence of two witnesses, this 19th day of June, 1900.

WILLIAM K. ALLEN.

Witnesses:
  T. J. GEISLER,
  E. M. HOWATSON.